T. C. CRAVEN.
Machines for Making Cotton-Laps.
No. 147,104. Patented Feb. 3, 1874.
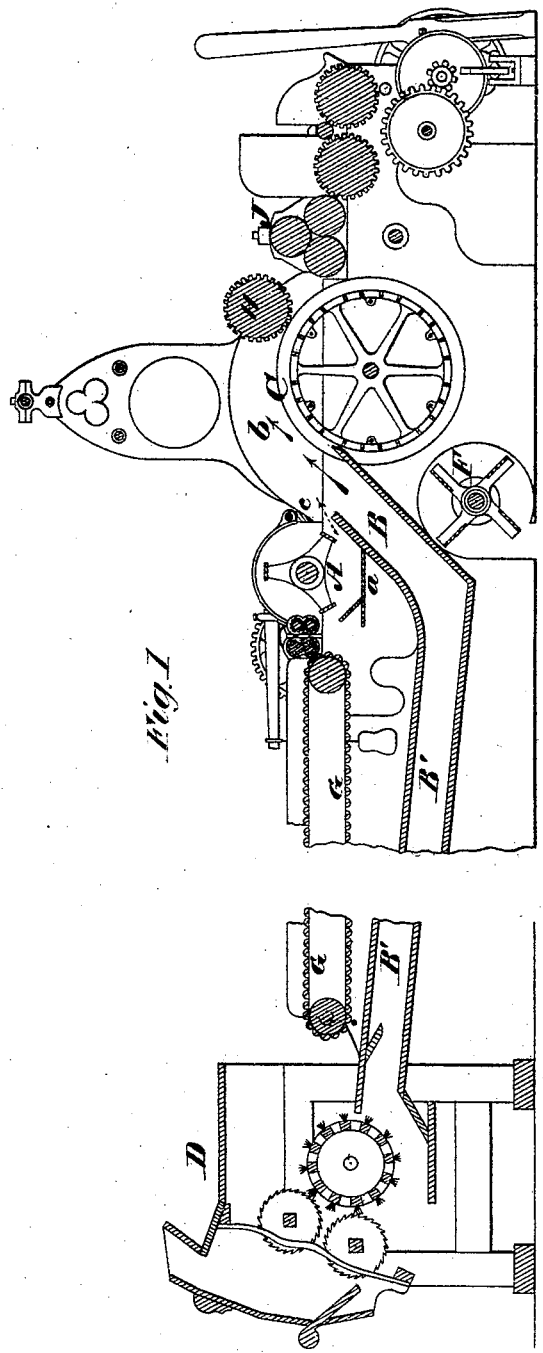
WITNESSES.
Villette Anderson
Phil. C. Masi
INVENTOR.
Thos. C. Craven
Chipman Hosmer & Co
Attys

UNITED STATES PATENT OFFICE

THOMAS C. CRAVEN, OF HUDSON, NEW YORK, ASSIGNOR TO GEORGE H. POWER, OF SAME PLACE.

IMPROVEMENT IN MACHINES FOR MAKING COTTON-LAPS.

Specification forming part of Letters Patent No. 147,104, dated February 3, 1874; application filed September 20, 1873.

CASE C.

*To all whom it may concern:*

Be it known that I, THOMAS C. CRAVEN, of Hudson, in the county of Columbia and State of New York, have invented a new and valuable Improvement in Machinery for Making Cotton-Laps; and I do hereby declare that the following is a full, clear, and exact description of the construction and operation of the same, reference being had to the annexed drawings making a part of this specification, and to the letters and figures of reference marked thereon.

Figure 1 of the drawings is a representation of my machine for making cotton-laps sectioned longitudinally.

The object of this invention is to combine the scutcher of an ordinary or well-known cotton-lapping machine and the revolving screen or cage thereof with the delivery-flue of a cotton-gin, for the purpose of introducing lint-cotton from the gin direct to the lap-forming mechanism, without interfering with the working of the lapper in the ordinary way, thus providing for mixing with the lint-cotton the scutched cotton, and thereby utilizing the latter in the production of a salable medium article.

The following description of my invention will enable others skilled in the art to fully understand it.

In the annexed drawings, I have represented my improvement applied to a well-known form of machinery for ginning cotton and making the laps, and I will now proceed to describe how I apply my improvement thereto.

I cut off part of the plate $a$, which is beneath the scutcher A, and insert a flue, B, between the scutcher and the revolving cage or screen C, which communicates with the long flue B′, leading from the gin D, which flue B is carried upward and backward, and terminated in such relation to the scutcher A that the ginned cotton is directed through it into a chamber, $b$, above the cage or screen C, as indicated by the arrows in full lines. Between the upper end of the front plate of the flue B and a plate, $c$, is a space, through which the cotton from the scutcher A escapes into said chamber $b$, to be, like the cotton from the gin, subjected to the action of a blast from the fan F. The said front plate of the flue B is arranged a little behind the lower edge of the plate $c$, so that the cotton direct from the gin will not be acted on by the scutcher, nor will the cotton from the latter interfere with the delivery of the cotton into the chamber $b$ from the flue B.

It will be seen from the above description that I can run cotton direct from the gin-brushes into the chamber above the cage C without scutching it; also, that I can use the scutcher alone, or, when desired, I can make a compound lap by working cotton of one grade through the scutcher, and cotton of another grade through the flue B, and mixing the two grades in and beyond the chamber $b$. G represents an endless apron, on which the cotton is moved to the scutcher A. H is the pressure-roller on cage C, and J are the calendering-rolls, which may be constructed and arranged in the usual well-known manner, and to which I make no claim. It will also be seen that my improvement is readily and cheaply applicable to any well-known kind of cotton-lapper.

What I claim as new, and desire to secure by Letters Patent, is—

In combination with a scutcher, A, and cage C, the gin D and the flue or passage leading therefrom, and arranged in communication with the passage from the scutcher, to deliver the ginned and scutched cotton together into the chamber of the cage, substantially as specified.

In testimony that I claim the above I have hereunto subscribed my name in the presence of two witnesses.

THOS. C. CRAVEN.

Witnesses:
PHIL. C. MASI,
JOS. B. LOOMIS.